US012724787B2

(12) United States Patent
Sankaran et al.

(10) Patent No.: US 12,724,787 B2
(45) Date of Patent: Sep. 1, 2026

(54) DATASOURCE CREATION USING EMBEDDED APPLICATION METADATA

(71) Applicant: SAP SE, Walldorf (DE)

(72) Inventors: Vignesh Sankaran, Bangalore (IN); Srinivas Vinnakota, Bangalore (IN); Arpitha A Shetty, Kannada (IN); Sohandeep Das, Kolkata (IN)

(73) Assignee: SAP SE, Walldorf (DE)

( * ) Notice: Subject to any disclaimer, the term of this patent is extended or adjusted under 35 U.S.C. 154(b) by 429 days.

(21) Appl. No.: 18/050,427

(22) Filed: Oct. 27, 2022

(65) Prior Publication Data

US 2024/0143616 A1 May 2, 2024

(51) Int. Cl.
*G06F 16/25* (2019.01)
*G06F 16/245* (2019.01)

(52) U.S. Cl.
CPC .......... *G06F 16/254* (2019.01); *G06F 16/245* (2019.01)

(58) Field of Classification Search
CPC ............................. G06F 16/254; G06F 16/245
USPC .......................................................... 707/602
See application file for complete search history.

(56) References Cited

U.S. PATENT DOCUMENTS 10,693,883 B2 6/2020 Kathiara et al.
10,824,544 B1 11/2020 Nagal et al.
2016/0321291 A1* 11/2016 Malhotra .............. G06F 16/188
2020/0334272 A1* 10/2020 Hrastnik ............... G06F 16/245
2021/0149886 A1* 5/2021 Zheng ....................... G06N 5/02
2021/0389883 A1* 12/2021 Derryberry ......... G06F 11/2094
2022/0179752 A1* 6/2022 Thanasekaran ......... H04L 43/08
2022/0342888 A1* 10/2022 Chekuri .............. G06F 9/45558
2022/0382761 A1* 12/2022 Dodson ............... G06F 21/6227
2023/0359506 A1* 11/2023 Bhujanga ................ G06F 16/27
2023/0376744 A1* 11/2023 Zhou ...................... G06Q 10/10

OTHER PUBLICATIONS

Anonymous: "Couchbase Server 3.0 Contents", Jun. 8, 2015 (Jun. 8, 2015), pp. 1-547, XP055597837, Internet Retrieved from the Internet: URL:https://docs.couchbase.com/files/couchbase-server-3.0-guide-2015-06-08.pdf [retrieved on Jun. 19, 2019].
European Patent Office, Extended European Search Report, issued in EU Application No. 23189350.4, dated Jan. 9, 2024, 12 pgs.

* cited by examiner

*Primary Examiner* — Ann J Lo
(74) *Attorney, Agent, or Firm* — Fountainhead Law Group, PC

(57) ABSTRACT

An application embedded within a cloud application may load a data object which accesses information from a database to generate visualizations of data. When the data object is transported from a development system to a production system, the database may not have table entries and views as expected and loading the data object might fail. In such cases, the datasource may be created from metadata. A first metadata call is sent to the database using the application metadata and an indication that a datasource was not found is received from the database. Query metadata is extracted from the application metadata of the data object and a datasource creation call is sent to the database using the extracted query metadata, thereby initiating creation of a datasource artifact in the database. Then, query results are obtained based on the datasource artifact and query results are provided in the cloud application.

20 Claims, 5 Drawing Sheets

DATASOURCE CREATION USING EMBEDDED APPLICATION METADATA

BACKGROUND

The present disclosure pertains to cloud-based applications and databases.

Various cloud applications, such as analytics dashboard applications, can query a database access information. The such analytics applications may be embedded in other cloud-based applications to provide them with functionality for accessing a database and generating visualizations of data.

Certain applications have development systems to create data objects (e.g., create analytics reports) before they transported to production systems. In the development system, users may build queries (e.g., with joins, calculations, filters etc.) based on fact tables of the development system. The built query metadata may be saved as an entry in development system's database. However, when the data objects are later transported to production systems metadata table entries and associated view may not be available in the production system's database, causing use of the data object to fail.

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to load a data object in an embedded application within a cloud application, the data object including application metadata. The instructions may be further executable by the one or more processors to send a first metadata call to a database using the application metadata. The instructions may be further executable by the one or more processors to receive an indication from the database that a datasource was not found. The instructions may be further executable by the one or more processors to extract query metadata from the application metadata of the data object. The instructions may be further executable by the one or more processors to send a datasource creation call to the database using the extracted query metadata, the datasource creation call initiating creation of a datasource artifact in the database. The instructions may be further executable by the one or more processors to query the database to obtain query results based on the datasource artifact. The instructions may be further executable by the one or more processors to provide the query results in the cloud application.

Some embodiments provide one or more non-transitory computer-readable medium storing computer program code comprising sets of instructions. The computer program code may include sets of instructions to load a data object in an embedded application within a cloud application, the data object including application metadata. The computer program code may further include sets of instructions to send a first metadata call to a database using the application metadata. The computer program code may further include sets of instructions to receive an indication from the database that a datasource was not found. The computer program code may further include sets of instructions to extract query metadata from the application metadata of the data object. The computer program code may further include sets of instructions to send a datasource creation call to the database using the extracted query metadata, the datasource creation call initiating creation of a datasource artifact in the database. The computer program code may further include sets of instructions to query the database to obtain query results based on the datasource artifact. The computer program code may further include sets of instructions to provide the query results in the cloud application.

Some embodiments provide a computer-implemented method. The method may comprise loading, by a computer system, a data object in an embedded application within a cloud application, the data object including application metadata. The method may further comprise sending, by the computer system, a first metadata call to a database using the application metadata. The method may further comprise receiving, by the computer system, an indication from the database that a datasource was not found. The method may further comprise extracting, by the computer system, query metadata from the application metadata of the data object. The method may further comprise sending, by the computer system, a datasource creation call to the database using the extracted query metadata, the datasource creation call initiating creation of a datasource artifact in the database. The method may further comprise querying, by the computer system, the database to obtain query results based on the datasource artifact. The method may further comprise providing, by the computer system, the query results in the cloud application.

The following detailed description and accompanying drawings provide a better understanding of the nature and advantages of the present disclosure.

DETAILED DESCRIPTION

Figure 1:
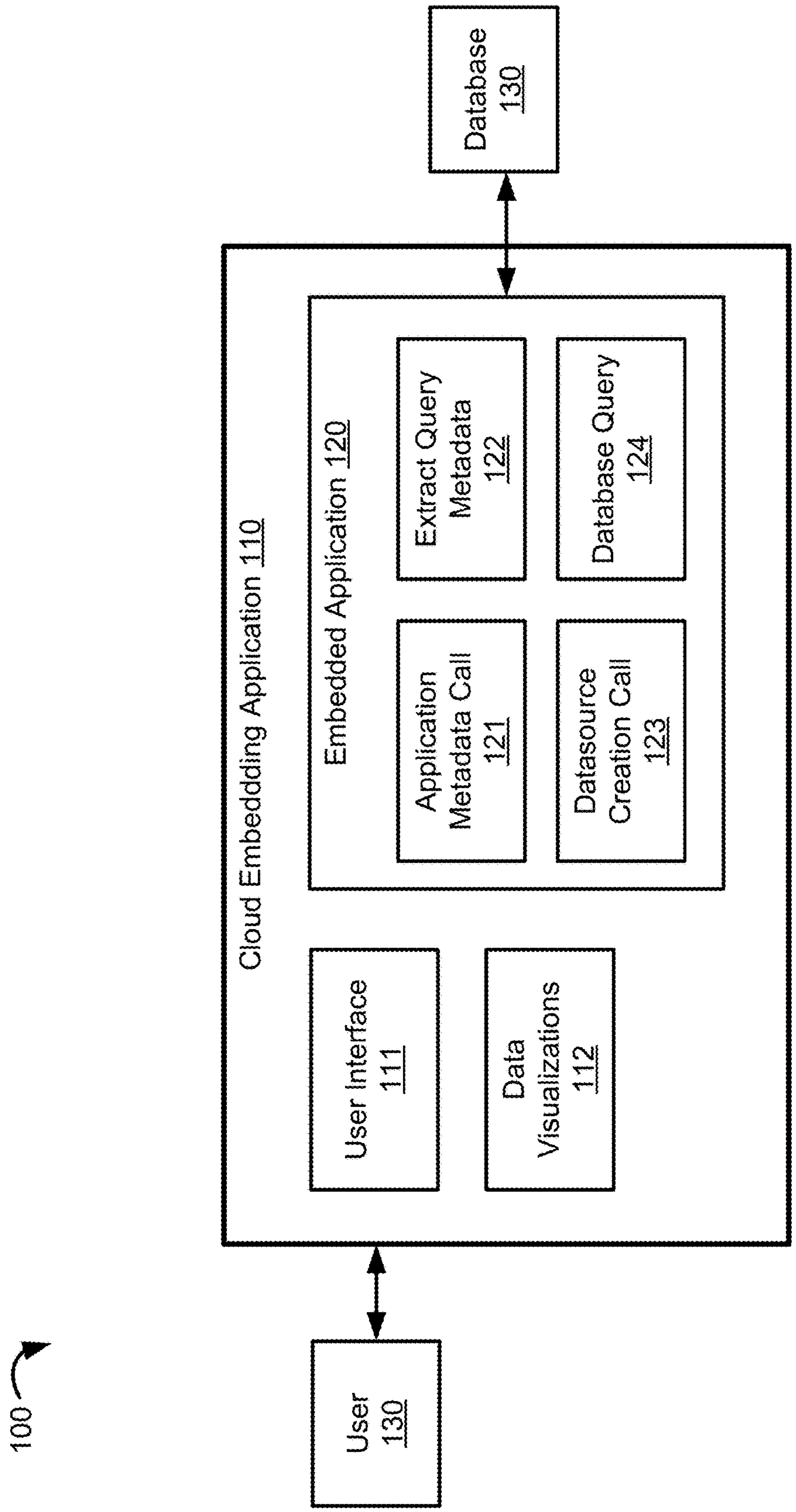
FIG. 1 shows a diagram of a cloud computing system providing a cloud application with an embedded application, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms “first,” “second,” “third,” “fourth,” “fifth,” “sixth,” “seventh,” “eighth,” “ninth,” “tenth,” etc., do not necessarily indicate an ordering or sequence unless indicated. These terms, as used herein, may simply be used for differentiation between different objects or elements.

As mentioned above, various cloud applications, such as analytics dashboard applications, can query a database access information. The such analytics applications may be embedded in other cloud-based applications to provide them with functionality for accessing a database and generating visualizations of data.

Certain applications have development systems to create data objects (e.g., create analytics reports) before they transported to production systems. In the development system, users may build queries (e.g., with joins, calculations, filters etc.) based on fact tables of the development system. The built query metadata may be saved as an entry in development system’s database. However, when the data objects are later transported to production systems metadata table entries and associated view may not be available in the production system’s database, causing use of the data object to fail.

One example of an application that may use development systems to create data objects before transporting them to production systems is a cloud-based analytics application. For example, an embedded cloud analytics application may be embedded into various other cloud-based applications. Embedding the application may provide unified and harmonized reporting within an organization, for example. In this example, the embedding applications may have development landscapes (e.g., development systems) to build reports before transporting them to production systems. In the development landscapes, users may build their own queries, with various joins, calculations, filters, etc.) based on their fact tables. The built query metadata will be saved as a JSON within Story’s Metadata for Client-side workflows and as an entry inside a Query Metadata table in the landscape’s DB. The same JSON may be used to create a Calculation View that may be the data source for the created story.

However, when the built & tested stories are later transported to production tenants, though the Embedding Application’s data tables are already available in production landscape, the embedded cloud analytics Metadata table entries and associated Calculation Views for story may not be available in the production landscape’s database initially, and thus opening the story will fail.

The present disclosure provides datasource creation techniques to remedy these issues. As described below, the Query Metadata that is available within the Story’s Metadata may be used for data source creation. Features and advantages include the data source creation will be a one-time activity for a specific story’s lifetime on that tenant. In addition, the user will have a seamless user experience since these data source creation activities will happen behind the scenes and no errors/warning will be shown to the user for this scenario. The user will just notice Story Opening and rendering right data on it.

When the built & tested stories are later transported to production tenants, though Embedding Application’s data tables are already available in production landscape, the embedded cloud analytics Metadata table entries and associated Calculation View(s) for story will not be available in the production landscape’s DB initially and thus opening the story will fail.

FIG. 1 shows a diagram 100 of a cloud embedding application 110 with an embedded application 120, according to an embodiment. The cloud embedding application 110 includes a user interface 111 and a data visualization module 112 for generating visualizations and reports based on queries to a database 130. A user 130 of a user device (not shown) may access the cloud application and the user interface 111.

The cloud embedding application 110 includes an embedded application 120. The embedded application includes an application metadata call module 121 configured to make a metadata call to the database 130. The embedded application also includes an extract query metadata module 122 configured to extract query metadata from a data object such as an analytical report or story object. The embedded application also includes a datasource creation call module 123 configured to send a call to the database including extracted query metadata. The embedded application also includes a database query module 124 configured to query the database and obtain query requests to be presented in the data visualizations 112.

Figure 2:
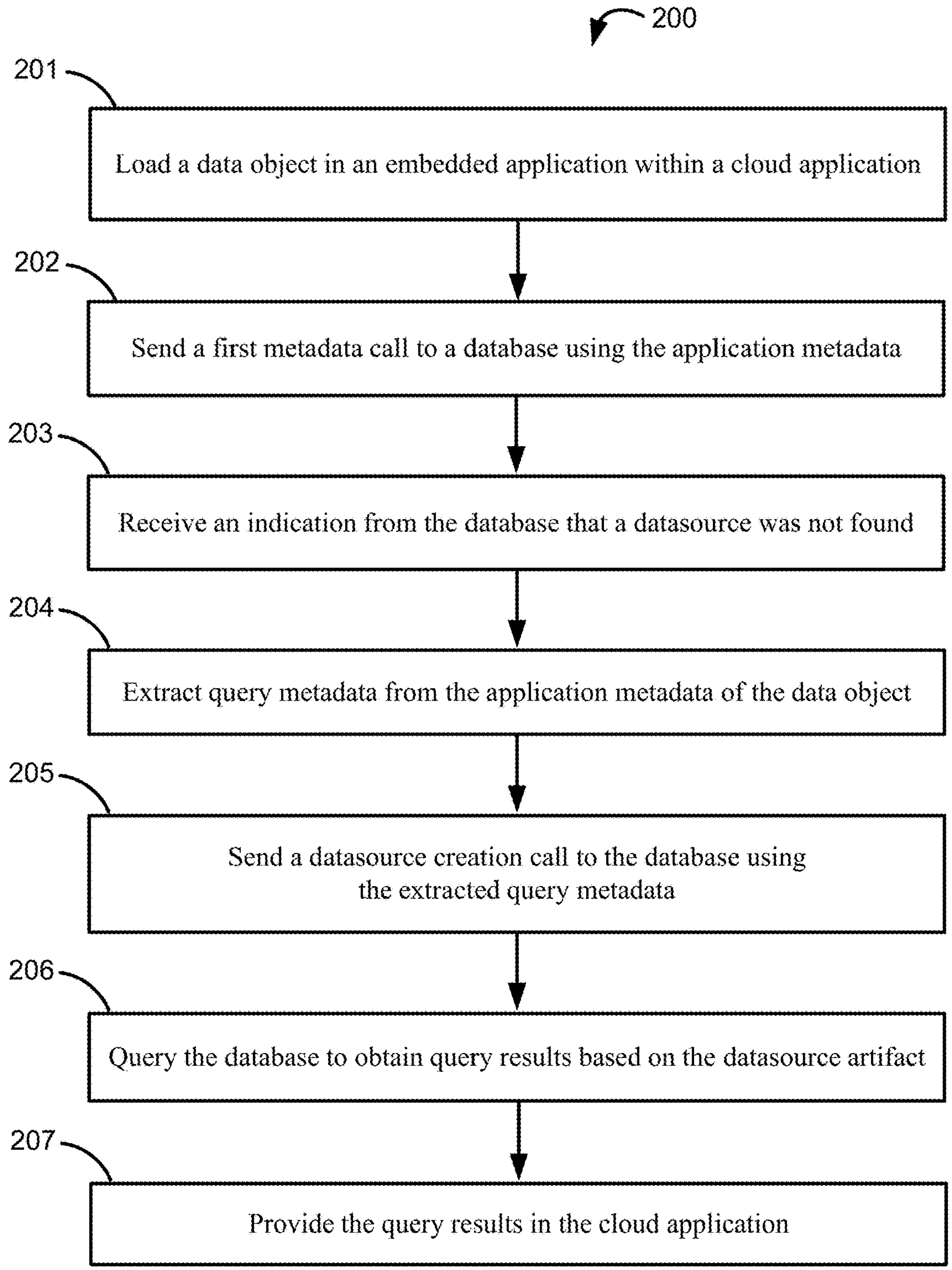
FIG. 2 shows a diagram of a method for creating a datasource database artifact, according to an embodiment.

FIG. 2 shows a diagram 200 of a method for creating a datasource database artifact, according to an embodiment. The method may be performed by an embedded application within a cloud application. For example, the method may be performed by the embedded application 120 described above with respect to FIG. 1.

At 201, the method may load a data object in an embedded application within a cloud application. The data object may include application metadata. In some embodiments the data object may have been previously received from a development system. In some embodiments, the embedded application is an analytics application and the data object is an analytical report object. In some embodiments, the embedded application is loaded in an iframe within a web browser.

At 202, the method may send a first metadata call to a database using the application metadata.

At 203, the method may receive an indication from the database that a datasource was not found.

At 204, the method may extract query metadata from the application metadata of the data object. In some embodiments, the query metadata is stored as JavaScript Object Notation in the data object.

At 205, the method may send a datasource creation call to the database using the extracted query metadata. The datasource creation call may initiate creation of a datasource artifact in the database. The datasource creation call may further initiate storing of the extracted query metadata in the database.

At 206, the method may query the database to obtain query results based on the datasource artifact.

At 207, the method may provide the query results in the cloud application. The query results may be presented as an analytical visualization or report in the user interface.

In some embodiments, receive an indication that the second metadata call succeeded, wherein the querying of the database is performed in responding to receiving the indication that the second metadata call succeeded.

Figure 3:
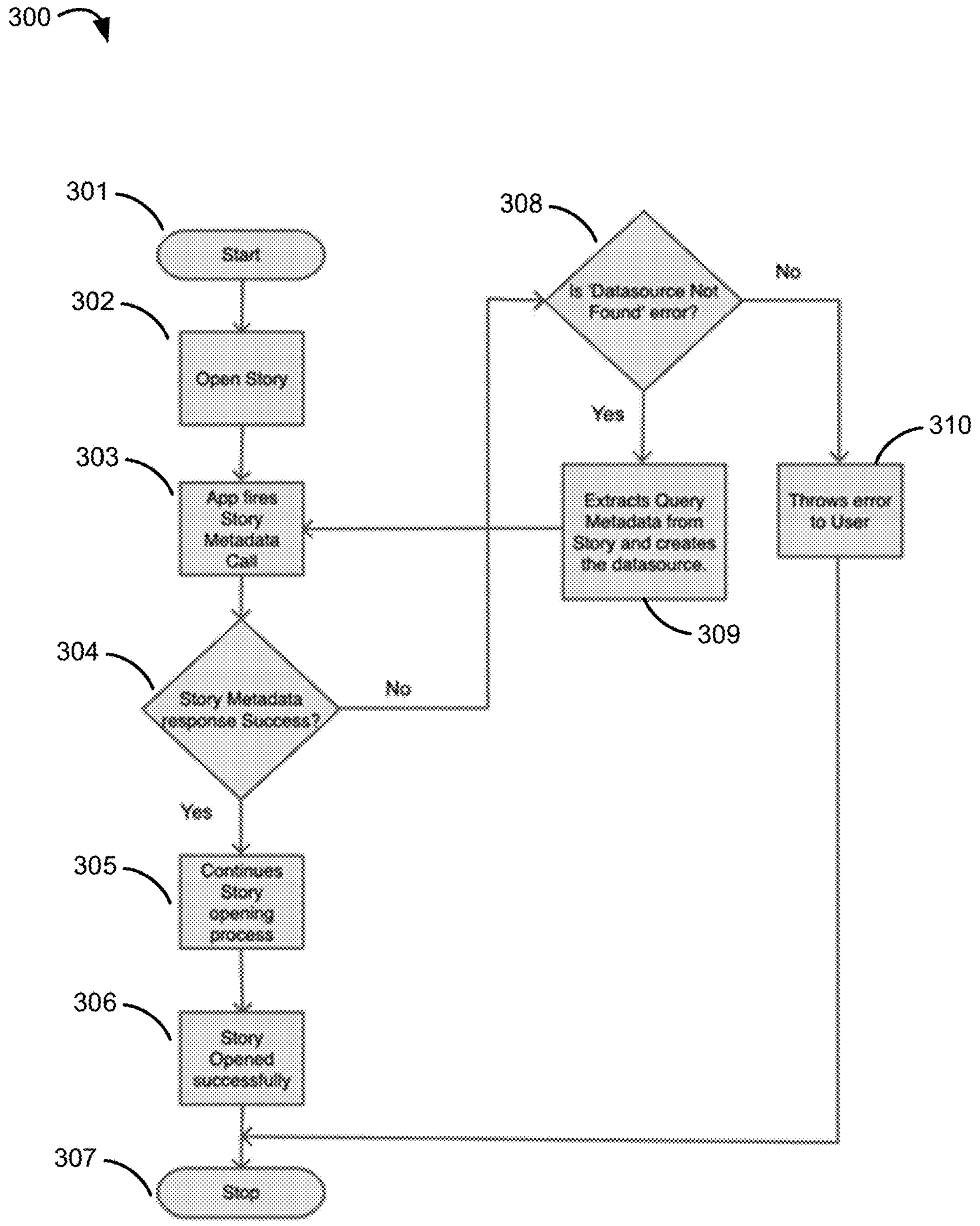
FIG. 3 shows a flowchart for making a metadata call and creating a datasource upon call failure, according to an embodiment.

FIG. 3 shows a flowchart 300 for making a metadata call and creating a datasource upon call failure, according to an embodiment.

At 301, the flowchart starts.

At 302, open story. This may be a user opening an analytical report within a cloud based analytics application.

At 303, the application fires a story metadata call. That is, the application may make an application metadata call to a database.

At 304, determine whether the story metadata response was a success. The determination may be based on a response received from the database in response to the application metadata call.

At 305, if "yes", the story metadata response was successful, continue story opening process. For example, query the database to obtain information for presenting in visualizations of the story report.

At 306, the story is opened successfully. For instance, the reports may be presented in a user interface At 307, the flow chart stops.

If "no" at 304, the story metadata response was not successful, at 308, determine whether a "datasource not found" error occurred.

If "yes" at 308, then at 309, extract the query metadata from the story and create the datasource at the database. Then return to 303 and the application fires the a second story metadata call.

If "no" at 308, then at 310 throw an error to the user and continue to end the flowchart at 307.

Figure 4:
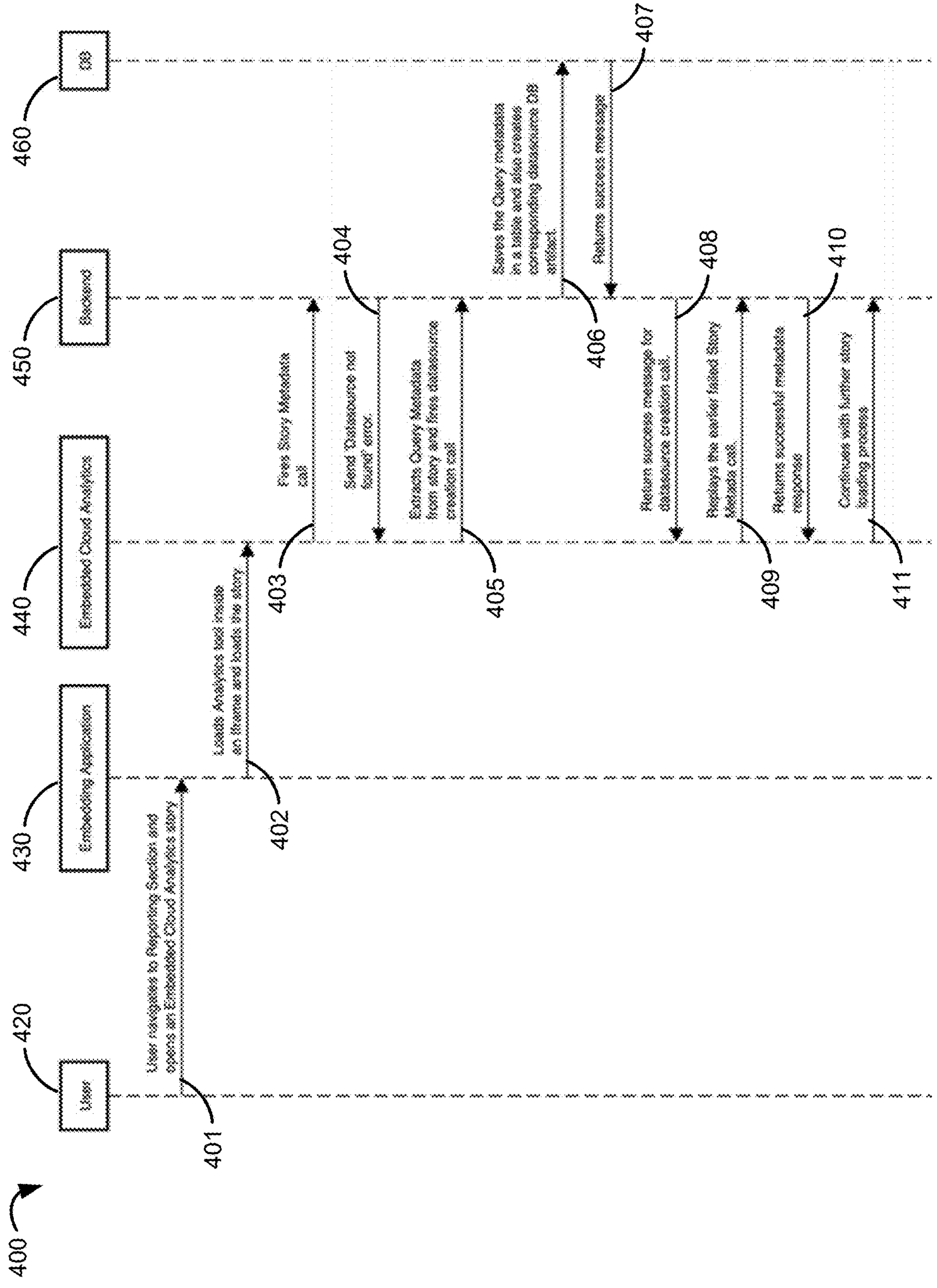
FIG. 4 shows a diagram of an embedded application making a failed metadata call and extracting query metadata for datasource creation, according to an embodiment.

FIG. 4 shows a diagram 400 of an embedded application making a failed metadata call and extracting query metadata for datasource creation, according to an embodiment. The diagram of FIG. 4 includes a user 420, an embedding application 430, embedded cloud analytics tool 440, a backend 450, and a database (DB) 460.

At 401, the user 420 navigates to a reporting section and opens an embedded cloud analytics story.

At 402, the embedding application loads analytics tool inside an iframe and loads the story.

At 403, the embedded cloud analytics tool 440 fires a story metadata call.

At 404, the backend 450 sends a datasource not found error.

At 405, the embedded cloud analytics application 440 extracts query metadata from the story and fires a datasource creation call.

At 406, the backend saves the query metadata in a table and also creates corresponding datasource database (DB) artifact.

At 407, the database 460 returns a success message.

At 408, the backend 450 returns a success message for datasource creation call.

At 409, the embedded cloud analytics tool 440 replays the earlier failed story metadata call.

At 410, the backend 450 returns successful metadata response.

At 411, the embedded cloud analytics tool 440 continues with further story loading process.

EXAMPLE HARDWARE

Figure 5:
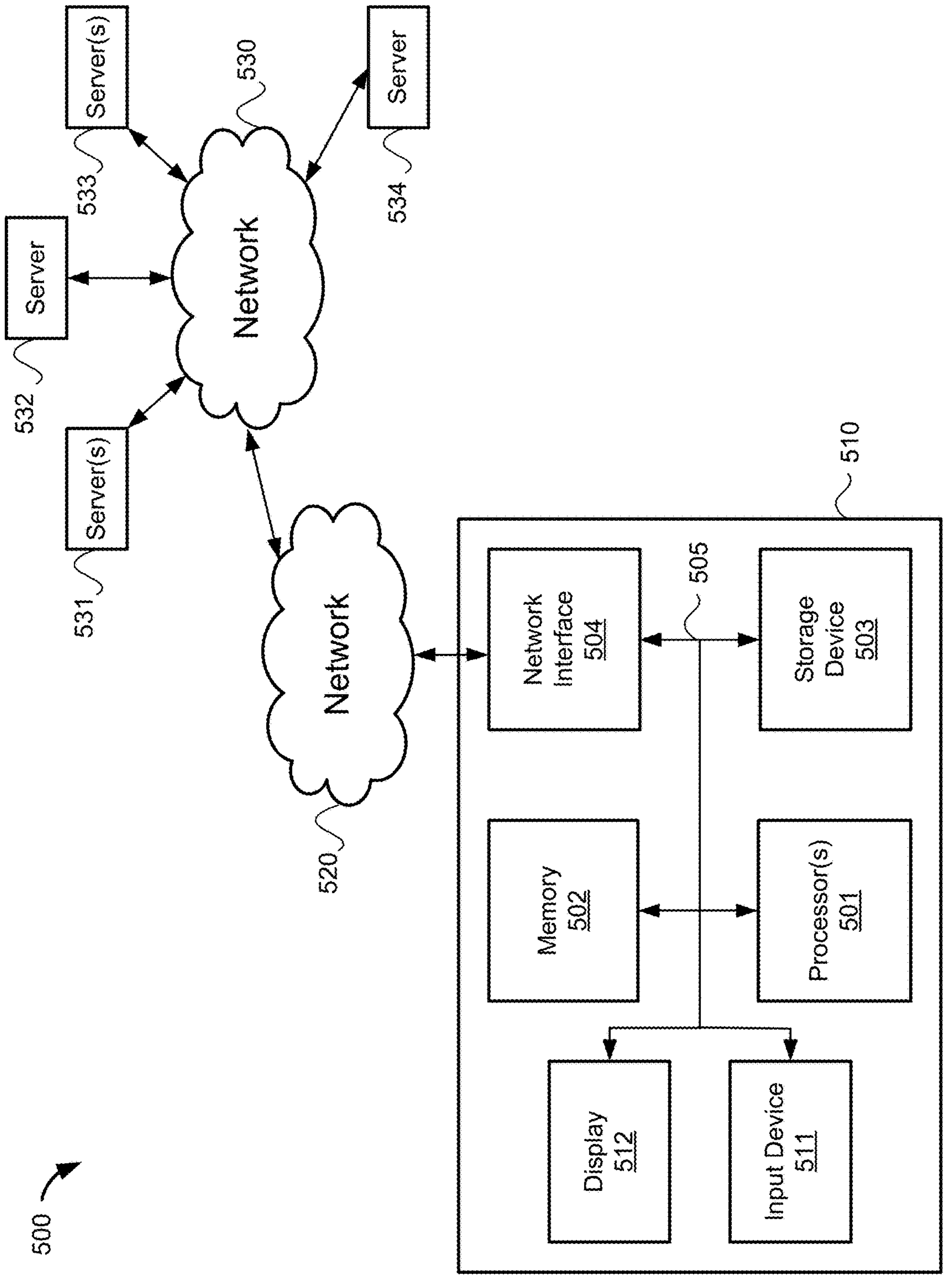
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

EXAMPLE EMBODIMENTS

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to load a data object in an embedded application within a cloud application, the data object including application metadata. The instructions may be further executable by the one or more processors to send a first metadata call to a database using the application metadata. The instructions may be further executable by the one or more processors to receive an indication from the database that a datasource was not found. The instructions may be further executable by the one or more processors to extract query metadata from the application metadata of the data object. The instructions may be further executable by the one or more processors to send a datasource creation call to the database using the extracted query metadata, the datasource creation call initiating creation of a datasource artifact in the database. The instructions may be further executable by the one or more processors to query the database to obtain query results based on the datasource artifact. The instructions may be further executable by the one or more processors to provide the query results in the cloud application.

In some embodiments of the computer system, wherein the datasource creation call further initiates storing of the extracted query metadata in the database.

In some embodiments of the computer system, the computer program code further comprises sets instructions executable by the one or more processors to receive the data object from a development system.

In some embodiments of the computer system, the computer program code further comprises sets instructions executable by the one or more processors to receive an indication that the second metadata call succeeded, wherein the querying of the database is performed in responding to receiving the indication that the second metadata call succeeded.

In some embodiments of the computer system, the query metadata is stored as JavaScript Object Notation in the data object.

In some embodiments of the computer system, the embedded application is an analytics application and the data object is an analytical report object.

In some embodiments of the computer system, the embedded application is loaded in an iframe within a web browser.

Some embodiments provide one or more non-transitory computer-readable medium storing computer program code comprising sets of instructions. The computer program code may include sets of instructions to load a data object in an embedded application within a cloud application, the data object including application metadata. The computer program code may further include sets of instructions to send a first metadata call to a database using the application metadata. The computer program code may further include sets of instructions to receive an indication from the database that a datasource was not found. The computer program code may further include sets of instructions to extract query metadata from the application metadata of the data object. The computer program code may further include sets of instructions to send a datasource creation call to the database using the extracted query metadata, the datasource creation call initiating creation of a datasource artifact in the database. The computer program code may further include sets of instructions to query the database to obtain query results based on the datasource artifact. The computer program code may further include sets of instructions to provide the query results in the cloud application.

In some embodiments of the non-transitory computer-readable medium, the datasource creation call further initiates storing of the extracted query metadata in the database.

In some embodiments of the non-transitory computer-readable medium, the computer program code further comprises sets instructions to receive the data object from a development system.

In some embodiments of the non-transitory computer-readable medium, the computer program code further comprises sets instructions to receive an indication that the second metadata call succeeded, wherein the querying of the database is performed in responding to receiving the indication that the second metadata call succeeded.

In some embodiments of the non-transitory computer-readable medium, the query metadata is stored as JavaScript Object Notation in the data object.

In some embodiments of the non-transitory computer-readable medium, the embedded application is an analytics application and the data object is an analytical report object.

In some embodiments of the non-transitory computer-readable medium, the embedded application is loaded in an iframe within a web browser.

Some embodiments provide a computer-implemented method. The method may comprise loading, by a computer system, a data object in an embedded application within a cloud application, the data object including application metadata. The method may further comprise sending, by the computer system, a first metadata call to a database using the application metadata. The method may further comprise receiving, by the computer system, an indication from the database that a datasource was not found. The method may further comprise extracting, by the computer system, query metadata from the application metadata of the data object. The method may further comprise sending, by the computer system, a datasource creation call to the database using the extracted query metadata, the datasource creation call initiating creation of a datasource artifact in the database. The method may further comprise querying, by the computer system, the database to obtain query results based on the datasource artifact. The method may further comprise providing, by the computer system, the query results in the cloud application.

In some embodiments of the computer-implemented method, the datasource creation call further initiates storing of the extracted query metadata in the database.

In some embodiments, the computer-implemented method further comprises receiving, by the computer system, the data object from a development system.

In some embodiments, the computer-implemented method receiving, by the computer system, an indication that the second metadata call succeeded, wherein the querying of the database is performed in responding to receiving the indication that the second metadata call succeeded.

In some embodiments of the computer-implemented method, the query metadata is stored as JavaScript Object Notation in the data object.

In some embodiments of the computer-implemented method, the embedded application is an analytics application and the data object is an analytical report object, and wherein the embedded application is loaded in an iframe within a web browser.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:

one or more processors;

one or more machine-readable medium coupled to the one or more processors and storing computer program code comprising sets instructions executable by the one or more processors to:

load a data object in an embedded application, wherein the embedded application is embedded within a cloud application, the data object including query metadata to build reports in the embedded application, wherein the cloud application is part of a production cloud system and the query metadata is further stored in a corresponding development system;

send a first metadata call to a database in the production cloud system using the query metadata;

receive an indication from the database that a datasource was not found;

in response to the indication that the datasource was not found:

extract the query metadata from the data object;

send a datasource creation call to the database using the extracted query metadata, the datasource creation call initiating creation of a datasource artifact in the database corresponding to the query metadata stored in the corresponding development system;

query the database to obtain query results based on the datasource artifact; and provide the query results to the embedded application to produce a data visualization in the cloud application.

2. The computer system of claim 1, wherein the datasource creation call further initiates storing of the extracted query metadata in the database.

3. The computer system of claim 1, wherein the computer program code further comprises sets instructions executable by the one or more processors to:

receive the data object from a development system.

4. The computer system of claim 1, wherein the computer program code further comprises sets instructions executable by the one or more processors to:

resend the first metadata call to the database;

receive an indication that the resent first metadata call succeeded, wherein the querying of the database is performed in responding to receiving the indication that the resent first metadata call succeeded.

5. The computer system of claim 1, wherein the query metadata is stored as JavaScript Object Notation in the data object.

6. The computer system of claim 1, wherein the embedded application is an analytics application and the data object is an analytical report object.

7. The computer system of claim 1, wherein the embedded application is loaded in an iframe within a web browser.

8. One or more non-transitory computer-readable medium storing computer program code comprising sets of instructions to:

load a data object in an embedded application, wherein the embedded application is embedded within a cloud application, the data object including query metadata to build reports in the embedded application, wherein the cloud application is part of a production cloud system and the query metadata is further stored in a corresponding development system;

send a first metadata call to a database in the production cloud system using the query metadata;

receive an indication from the database that a datasource was not found;

in response to the indication that the datasource was not found:

extract the query metadata from the data object;

send a datasource creation call to the database using the extracted query metadata, the datasource creation call initiating creation of a datasource artifact in the database corresponding to the query metadata stored in the corresponding development system;

query the database to obtain query results based on the datasource artifact; and provide the query results to the embedded application to produce a data visualization in the cloud application.

9. The non-transitory computer-readable medium of claim 8, wherein the datasource creation call further initiates storing of the extracted query metadata in the database.

10. The non-transitory computer-readable medium of claim 8, wherein the computer program code further comprises sets instructions to:

receive the data object from a development system.

11. The non-transitory computer-readable medium of claim 8, wherein the computer program code further comprises sets instructions to:

resend the first metadata call to the database;

receive an indication that the resent first metadata call succeeded, wherein the querying of the database is performed in responding to receiving the indication that the resent first metadata call succeeded.

12. The non-transitory computer-readable medium of claim 8, wherein the query metadata is stored as JavaScript Object Notation in the data object.

13. The non-transitory computer-readable medium of claim 8, wherein the embedded application is an analytics application and the data object is an analytical report object.

14. The non-transitory computer-readable medium of claim 8, wherein the embedded application is loaded in an iframe within a web browser.

15. A computer-implemented method, comprising:

loading, by a computer system, a data object in an embedded application, wherein the embedded application is embedded within a cloud application, the data object including query metadata to build reports in the embedded application, wherein the cloud application is part of a production cloud system and the query metadata is further stored in a corresponding development system;

sending, by the computer system, a first metadata call to a database in the production cloud system using the query metadata;

receiving, by the computer system, an indication from the database that a datasource was not found;

in response to the indication that the datasource was not found:

extracting, by the computer system, the query metadata from the data object;

sending, by the computer system, a datasource creation call to the database using the extracted query metadata, the datasource creation call initiating creation of a datasource artifact in the database corresponding to the query metadata stored in the corresponding development system;

querying, by the computer system, the database to obtain query results based on the datasource artifact; and providing, by the computer system, the query results to the embedded application to produce a data visualization in the cloud application.

16. The computer-implemented method of claim 15, wherein the datasource creation call further initiates storing of the extracted query metadata in the database.

17. The computer-implemented method of claim 15, further comprising:

receiving, by the computer system, the data object from a development system.

18. The computer-implemented method of claim 15, further comprising:

resend the first metadata call to the database;

receive an indication that the resent first metadata call succeeded, wherein the querying of the database is performed in responding to receiving the indication that the resent first metadata call succeeded.

19. The computer-implemented method of claim 15, wherein the query metadata is stored as JavaScript Object Notation in the data object.

20. The computer-implemented method of claim 15, wherein the embedded application is an analytics application and the data object is an analytical report object, and wherein the embedded application is loaded in an iframe within a web browser.

* * * * *